(12) United States Patent
Piponius et al.

(10) Patent No.: US 8,909,691 B2
(45) Date of Patent: Dec. 9, 2014

(54) PROXY FOR CONTENT SERVICE

(75) Inventors: Toni Markus Piponius, Helsinki (FI); Lauri Tapio Aarnio, Helsinki (FI); Timo Petteri Kiravuo, Helsinki (FI); Eija Riitta Helena Lehtovaara, Helsinki (FI); Tero Ilari Silvennoinen, Helsinki (FI); Hannu H. Kari, Veikkola (FI)

(73) Assignee: Cisco Technology, Inc., San Jose, CA (US)

( * ) Notice: Subject to any disclaimer, the term of this patent is extended or adjusted under 35 U.S.C. 154(b) by 2013 days.

(21) Appl. No.: 09/956,989

(22) Filed: Sep. 21, 2001

(65) Prior Publication Data

US 2002/0138601 A1    Sep. 26, 2002

(30) Foreign Application Priority Data

Mar. 23, 2001 (FI) .................................. 20010604

(51) Int. Cl.
| | |
|---|---|
| G06F 15/16 | (2006.01) |
| H04M 15/00 | (2006.01) |
| H04L 29/12 | (2006.01) |
| H04W 4/24 | (2009.01) |
| H04L 29/06 | (2006.01) |
| H04L 29/08 | (2006.01) |

(52) U.S. Cl.
CPC ...... *H04M 15/00* (2013.01); *H04M 2215/0164* (2013.01); *H04L 69/329* (2013.01); *H04M 15/68* (2013.01); *H04L 61/35* (2013.01); *H04L 29/12047* (2013.01); *H04W 4/24* (2013.01); *H04L 61/15* (2013.01); *H04M 2215/32* (2013.01); *H04L 29/12783* (2013.01); *H04L 61/2084* (2013.01); *H04M 2215/0196* (2013.01); *H04L 29/06* (2013.01); *H04M 2215/2026* (2013.01); *H04L 29/12311* (2013.01); *H04M 2215/22* (2013.01); *H04M 15/41* (2013.01)

USPC ............ 709/202; 709/218; 709/223; 705/40; 725/1; 725/5

(58) Field of Classification Search
CPC ............ H04N 21/2543; H04N 21/222; H04N 21/2407; H04L 65/4084; H04L 12/14; H04L 12/1403
USPC ......... 709/202, 219, 218, 223, 203, 225, 229; 705/32, 40; 725/1, 4, 5
See application file for complete search history.

(56) References Cited

U.S. PATENT DOCUMENTS 5,319,454 A * 6/1994 Schutte ............................ 725/6
5,778,189 A * 7/1998 Kimura et al. ................. 709/236

(Continued)

FOREIGN PATENT DOCUMENTS

EP   0 924 630 A1   12/1998 ............. G06F 17/60
EP   0 924 630 A1   6/1999

(Continued)

OTHER PUBLICATIONS

Printout of the definition of "control" from dictionary.com printed Aug. 7, 2007. 4 pages.*

(Continued)

*Primary Examiner* — David Lazaro
(74) *Attorney, Agent, or Firm* — Baker Botts L.L.P.

(57) ABSTRACT

A method for providing a content service to a subscriber terminal (MS) from a first server, i.e. content server (CS). The provision of the content service from the content server to the subscriber terminal is controlled by a second server, i.e. proxy (CBP). The control comprises the following steps: 1) determining (5-4 to 5-10, 706) a billing address for the content service by means of the proxy (CBP); 2) under the control of the content billing proxy, providing (5-48) a content service corresponding to a service request from the content server (CS) to the subscriber terminal (MS); and 3) generating (5-46) billing information (CDR) related to the content service.

26 Claims, 5 Drawing Sheets

(56) References Cited

U.S. PATENT DOCUMENTS

| | | | |
|---|---|---|---|
| 5,852,812 A * | 12/1998 | Reeder | 705/39 |
| 5,905,736 A * | 5/1999 | Ronen et al. | 370/546 |
| 5,956,391 A * | 9/1999 | Melen et al. | 705/40 |
| 5,970,477 A * | 10/1999 | Roden | 709/219 |
| 6,016,509 A | 1/2000 | Dedrick | 709/224 |
| 6,035,281 A | 3/2000 | Crosskey et al. | 705/14 |
| 6,047,051 A * | 4/2000 | Ginzboorg et al. | 705/40 |
| 6,208,977 B1 | 3/2001 | Hernandez et al. | 705/34 |
| 6,343,323 B1 | 1/2002 | Kalpio et al. | 709/229 |
| 6,389,537 B1 * | 5/2002 | Davis et al. | 713/187 |
| 6,611,821 B2 | 8/2003 | Stahl et al. | 705/400 |
| 6,665,537 B1 | 12/2003 | Lioy | 455/435 |
| 6,714,931 B1 | 3/2004 | Papierniak et al. | 707/10 |
| 6,977,917 B2 * | 12/2005 | Skog et al. | 370/349 |
| 2002/0059114 A1 * | 5/2002 | Cockrill et al. | 705/40 |
| 2002/0129088 A1 * | 9/2002 | Zhou et al. | 709/200 |

FOREIGN PATENT DOCUMENTS

| | | | |
|---|---|---|---|
| WO | WO 98/26381 | 6/1998 | G07F 7/10 |
| WO | WO 99/31610 | 6/1999 | |
| WO | WO 99/62036 | 12/1999 | |
| WO | WO 00/42735 | 7/2000 | |

OTHER PUBLICATIONS

*European Patent Office, Communication Pursuant to Article 94(3) EPC*, European Patent Application No. 02 704 793.5-2416, 4 pages, Oct. 14, 2008.

\* cited by examiner

PROXY FOR CONTENT SERVICE

BACKGROUND OF THE INVENTION

The invention relates to a proxy. When establishing a connection from a subscriber terminal to a server of a content provider, a proxy participates in establishing the connection and/or billing for it.

In a normal situation, a subscriber terminal connects to an access network and a server of a content provider is connected to a service network. The access network can be a cellular radio access network, such as GPRS (General Packet Radio Service) or WLAN (wireless local area network). The service network is typically an IP (Internet Protocol) network, such as the Internet or closed subnetworks thereof (intranet, extranet, etc.). These network types are naturally only illustrative and not restricting examples.

To provide a concrete example, the invention will be described using a GPRS network. GPRS is a packet-switched telecommunications network operating on top of the GSM network and can be used to switch Internet telecommunication to terminals. The terminals can be mobile phones, handheld computers and portable computers, for instance.

The connection from the GPRS network to the Internet is through a gateway GPRS support node GGSN. The GPRS network establishes a tunnel from the edge of the network to the terminal. In other words, the network processes IP packets of users in the terminal and GGSN only. In a normal situation, one terminal uses only one GGSN node at a time, but if the terminal is in between switched off, for instance, it can use another GGSN node next time. However, all traffic between the terminal and an external network (such as the Internet) only goes through one GGSN node at a time.

The Internet interface in connection with a GGSN node is called a gateway and different technical services can be provided through it. Typical services include an IP address translation service NAT (Network Address Translation) that in practice provides a limitless number of addresses in a GPRS network, a WWW traffic proxy, a cache memory, and firewall services. The services can be technically implemented in different parts of the network or in different equipment.

Billing in the GPRS network differs from billing in a conventional mobile network in that it provides more alternatives. A teleoperator may bill for the use of the network on the basis of one or more of the following: 1) a fixed monthly charge; 2) the time the terminal is connected to the GPRS network (even though it does not necessarily communicate anything); and 3) the amount of data transmitted in the network (bytes or packets, for instance).

A general problem underlying the invention is that the access network side (a public switched telephone network or cellular mobile network, for instance) has mechanisms for billing the subscriber of the terminal on the basis of the number that is called or to which a short message is sent. The billing methods of access networks do not, however, allow billing on the basis of content in such a manner, for instance, that the charge for retrieving the WWW pages of a content provider would depend on the price set by the content provider on the information. The present billing systems of the GPRS network do not take into account the content of the telecommunication, only the connection time and the traffic volume.

This basic problem is generally known in the field and solutions for it are actively discussed in the trade forums. The problem is called 'billing for content'.

A number of sub-problems can be derived from this basic problem:
1 How can a user monitor his or her own expenses when a solely volume-based or content-based billing is used?
2 How to implement a 0800-type toll-free service, i.e. the service is billed to the content provider (not the user)?
3 How can the payer of the access network (e.g. GPRS) connection who is not necessarily the same person as the user, restrict the use of the service?
4 How can a person who has bought a license to use a chargeable data content gain access to the content after a technical failure or for a fixed time so that the license to the service entity is paid once (like one buys an entire newspaper)?
5 How will the time of day be taken into account if the service charge depends on it?
6 How to direct the costs to the correct user?

Present GPRS network solutions for pricing content are based on the fact that the content (generally WWW pages) to be provided to the customer are located in a content server managed by the teleoperator (i.e. the operator of the access network) and the server is connected to the billing system of the teleoperator. The use of the content can be restricted using a user identifier and password combination. Alternatively, there may be a telecommunications connection for transmitting billing data between the billing system of the teleoperator and the service platform of the content provider. In these solutions, all traffic is priced using one pricing model. Billing techniques used on the Internet are not very advanced, either. Most systems allowing billing for content are based on a separate user agreement (the existence of which is verified by a user identifier and password). The payment is done by a data network-independent technique, such as credit card or bank transfer.

A specific problem with the known arrangements described above is that they do not offer simple payment transfers between the operators of the access network (such as telephone network or mobile network) and service network (such as the Internet), because the operator of the service network is not in practice able to bill the subscribers of the access network. The problem is slightly simpler if the same operator manages both the access network and the service network, but in this case, too, the operator cannot implement a flexible arrangement for content-based billing, and this requires that the content service is implemented in a certain access network only and is thus not available to subscribers of other access networks. Thus, an Internet site administrator, for instance, has not been greatly motivated to adapt corresponding services to suit mobile network terminals. A second problem caused by this is that only a small number of services has been provided to mobile subscribers.

BRIEF DESCRIPTION OF THE INVENTION

It is thus an object of the invention to develop a method and an apparatus implementing the method so as to solve the above-mentioned problem. The object of the invention is achieved by a method and system that are characterized by what is stated in the independent claims. Preferred embodiments of the invention are disclosed in the dependent claims.

According to an aspect of the invention, a method is provided for providing a content service to a subscriber terminal from a first server, i.e. content server, managed by a first operator. In the method, a second server, i.e. proxy, managed by a second operator controls the provision of the content service from the content server to the subscriber terminal, and said control of the content service provision comprises the following steps: 1) determining a billing address for the content service by means of the proxy; 2) under the control of the proxy, providing a content service corresponding to a service request from the content server to the subscriber terminal; and 3) generating billing information related to the content service.

According to a second aspect of the invention, a proxy is implemented for providing a content service to a subscriber terminal from a content server. The proxy comprises a control logic for controlling the provision of the content service from the content server to the subscriber terminal. The control logic comprises a first logic for determining a billing address for the content service, a second logic for providing, under the control of the proxy, a content service corresponding to a service request from the content server to the subscriber terminal, and a third logic for generating billing information related to the content service.

According to a preferred embodiment, the subscriber terminal is located in the access network, in which the subscriber terminal is addressed by an access network subscriber identity, and the content server is located in the service network (such as the Internet), in which it is addressed by an IP address, and the step of determining a billing address comprises the steps of: 1) allocating an IP address to the subscriber identity in the access network or at its edge; 2) receiving in the proxy the IP address allocated to the subscriber identity; 3) determining in the proxy on the basis of the received IP address a subscriber identity of the subscriber terminal and using it to determine a billing address.

According to a preferred additional feature, the determination of the subscriber identity on the basis of the received IP address comprises an inquiry to a database managed by the proxy operator. Alternatively or in addition to this (if no response is received from the database), the determination of the subscriber identity on the basis of the received IP address comprises an inquiry to the access network.

So that a mobile subscriber would receive only one bill for both the telecommunication in the access network and the content service provided through the service network, the billing information related to the content service is transmitted to the access network to be combined with the billing information maintained by the access network operator.

According to another preferred embodiment, the anonymity of the subscriber is secured by hiding the subscriber identity of the subscriber terminal from the content server.

According to a preferred embodiment, the generation of billing information comprises the maintenance of billing criteria in a database functionally connected to the proxy. The billing criteria preferably include the payer of the content service. If the content service is paid by its provider, the provider can also pay for the telecommunications costs between the subscriber terminal and the proxy, in which case the use of the content service is free of charge to the subscriber. It is also possible to compromise so that the provider of the content service pays a part of the telecommunications costs, in which case the use of the content service is partly free of charge to the subscriber.

The billing criteria preferably comprise information on whether the subscriber in question has already been billed for the same content service, in which case the following uses of the same content service are billed according to a lower tariff or not at all. The billing criteria can also comprise information on whether the content service in question belongs to a group of services with a special price. The use of a service belonging to a certain group would then entitle to the use of other services in the same group at a lower price or for free.

A primary application of the invention is based on the traffic between the access network and the service network being controlled by the proxy. A billing agreement is made between the operators of the content server and the proxy for providing the content service through the proxy. Information on the existence of the billing agreement is recorded in a database (or other memory) functionally connected to the proxy. The proxy controls the processing of a service request for a content service to find out whether the service request relates to the content service for which an agreement is recorded in the database. If the service request relates to the content service for which an agreement is recorded in the database, the content service corresponding to the service request is provided from the content server to the subscriber terminal under the control of the proxy and billing information related to the content service and to the terminal or its subscriber is generated.

The method and system of the invention provide the advantage that each content provider need not provide their own content-based billing, but this can be done in a centralized manner. Because the content-based billing can be done in a centralized manner, the billing can be very versatile without needing to copy this versatility everywhere in the service network. This means that mobile subscribers can be offered a large number of different billing policies, such as:

Who pays (the subscriber, content provider or someone else)?

If the content provider pays for the content of the service, he or she may even want to pay for the connection time or volume that would normally be billed by the mobile network operator; this way the subscriber can be provided a completely free of charge telephone connection even in a mobile network where the caller normally pays for the call.

A once billed service would be available for no extra charge (for instance the daily newspaper can be read during several different sessions).

Groups can be made of content services (for instance the use of one service entitles to the use of another service at a lower price or for free).

Because one proxy can serve several content servers, it is a big advantage that by means of the proxy, different billing logics can be implemented in a centralized manner. In addition, there is a confidential relationship between the access network operator and the mobile subscriber (the access network operator bills the subscriber), and this confidential relationship can also be utilized in the service network, even between several content service providers. Each individual content service provider needs not bill users of the service separately.

If different currencies are used in the access network and the service network, it is advantageous if the proxy performs the necessary currency conversions. Correspondingly, the proxy can perform the necessary protocol conversions from the protocol used by the content server to a protocol supported by the access network. For instance, the conversion can be done from an e-mail protocol SMTP (simple mail transfer protocol) to a http (hypertext transfer protocol) protocol.

BRIEF DESCRIPTION OF THE FIGURES

The invention will now be described in greater detail by means of preferred embodiments and with reference to the attached drawings, in which.

DETAILED DESCRIPTION OF THE INVENTION

Figure 1:
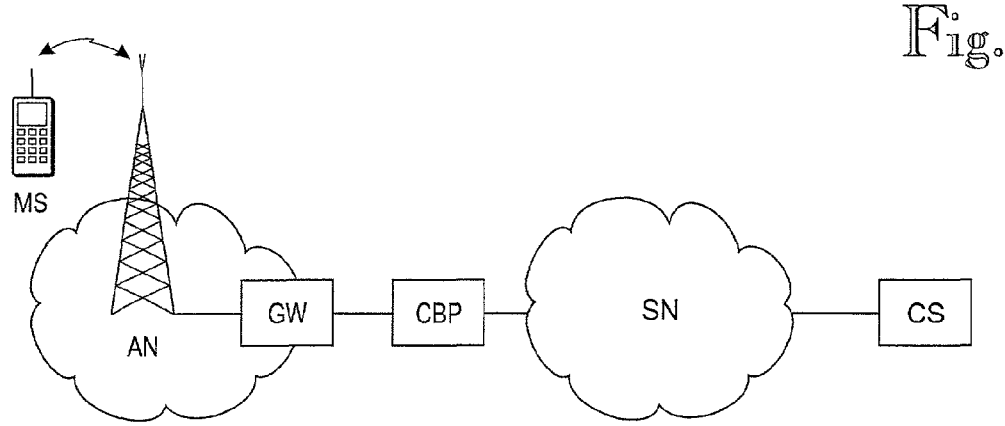
FIG. 1 shows a general block diagram of a system in which the invention can be used.

FIG. 1 is a general block diagram of a system in which the invention can be used. A terminal of a user, for instance a mobile station, MS is connected to an access network AN. The access network can be a cellular radio access network, such as GPRS (General Packet Radio Service) or a third-generation network, such as UMTS (Universal Mobile Telecommunications System), or for instance a wireless local area network WLAN. These examples of the access network are, however, not intended to limit the invention. The user of the terminal MS wants to use services that are not available within the access network AN only, but servers providing the services are connected to one or more service networks SN. In FIG. 1, such services and servers outside the access network AN are represented by a content provider server, i.e. content server CS in short, which provides news, data, entertainment and other services. So that the services outside the access network can be used, there is a gateway GW at the edge of the access network AN. The parts of FIG. 1 described so far herein are known to a person skilled in the art.

According to the invention, the traffic between the access network AN and one or more service networks SN is controlled by a content billing proxy CBP. Contrary to the billing in the access network, the billing logic of the content billing proxy CBP of the invention is not based on connection time or transmitted volume of data (this is done by the existing billing system of the access network operator), but on the service content received by the user from the content server CS. The structure and operation of the proxy CBP is described in more detail in connection with FIGS. 3 to 7.

Figure 2:
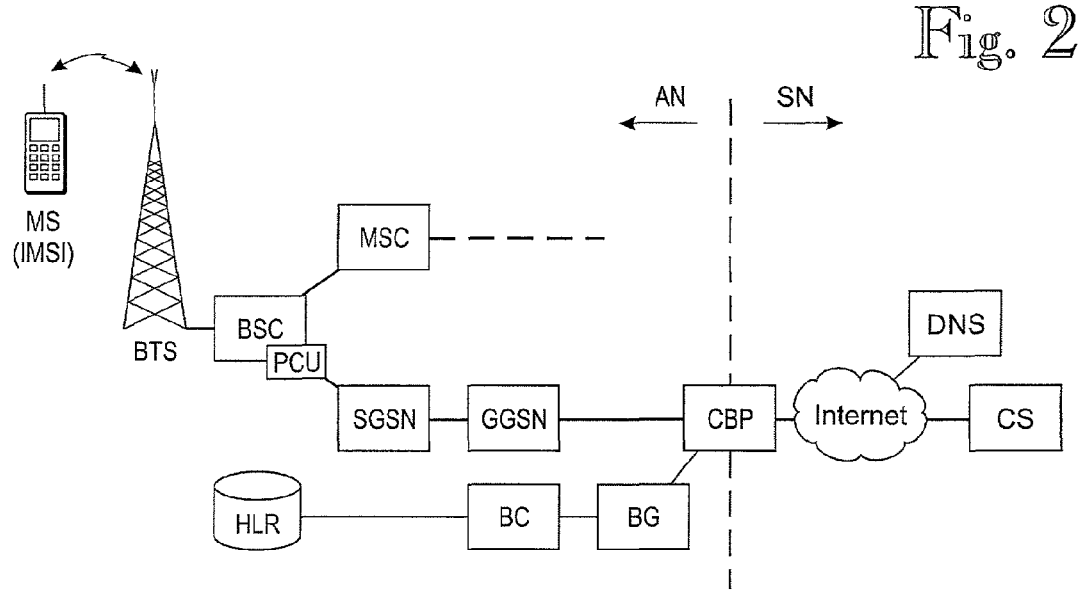
FIG. 2 is a more specific version of the block diagram of FIG. 1 in such a manner that the access network is GPRS and the service network is the Internet.

FIG. 2 is a more specific version of the block diagram of FIG. 1 in such a manner that the access network AN is GPRS and the service network SN is an IP network, such as the Internet or a closed sub-network thereof, called intranet or extranet. The access network AN comprises base transceiver stations BTS in such a manner that several base transceiver stations are typically under one base station controller BSC. Circuit-switched connections are controlled by a mobile services switching center MSC, but they are not as interesting for this GPRS-based example as packet-switched connections which are managed by GPRS support nodes GSN. Internal support nodes in the access network are called serving GPRS support nodes SGSN and nodes leading from the access network to external networks are called gateway GPRS support nodes GGSN. For establishing packet-switched connections, the base station controller BSC typically has a packet control unit PCU. For storing subscriber information, the access network has subscriber registers, such as a home location register HLR. For billing, the network has a billing center BC, to which a connection can be established through a billing gateway BG.

Figure 3:
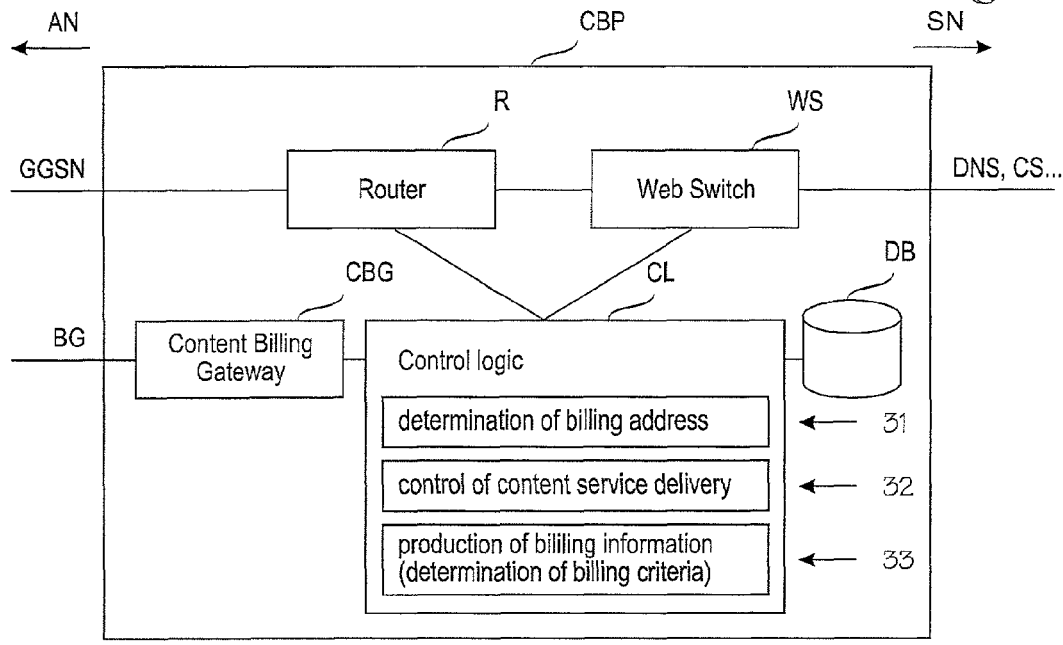
FIG. 3 is a block diagram illustrating a proxy of the invention.

FIG. 3 is a block diagram illustrating a preferred embodiment of the proxy CBP. In this example, the proxy CBP has five main blocks, or functions: router R, web switch WS, content billing gateway CBG, database DB, and control logic CL controlling the above blocks. When the proxy needs to be scaled (copied) due to heavy traffic, the critical blocks are the router and web switch. The control logic, content billing gateway and database can be common to several routers and web switches. Alternatively, the scaling due to heavy traffic can be implemented on a more general level in such a manner, for instance, that a separate load balancing unit is used to distribute the traffic to be directed to the content servers to be processed by several parallel control logic units CL.

The control logic CL comprises three main functions, or logics. The task of the first logic 31 is to determine a billing address for a content service (cf. steps 5-4 to 5-10 in FIG. 5 and step 706 in FIG. 7). The task of the second logic 32 is to provide a content service corresponding to a service request from the content server CS to the subscriber terminal MS under the control of the proxy (cf. steps 6-2 to 6-22 in FIG. 6). The task of the third logic 33 is to generate information related to charging detail records CDR related to the content service (cf. steps 6-24 and 6-26 in FIG. 6). Billing criteria are maintained for the generation of the billing information (cf. steps 706 and 710 in FIG. 7). The billing criteria are most preferably maintained in a database DB of the proxy, but it is also possible to request them (or receive them automatically) from the content server CS.

Figure 4:
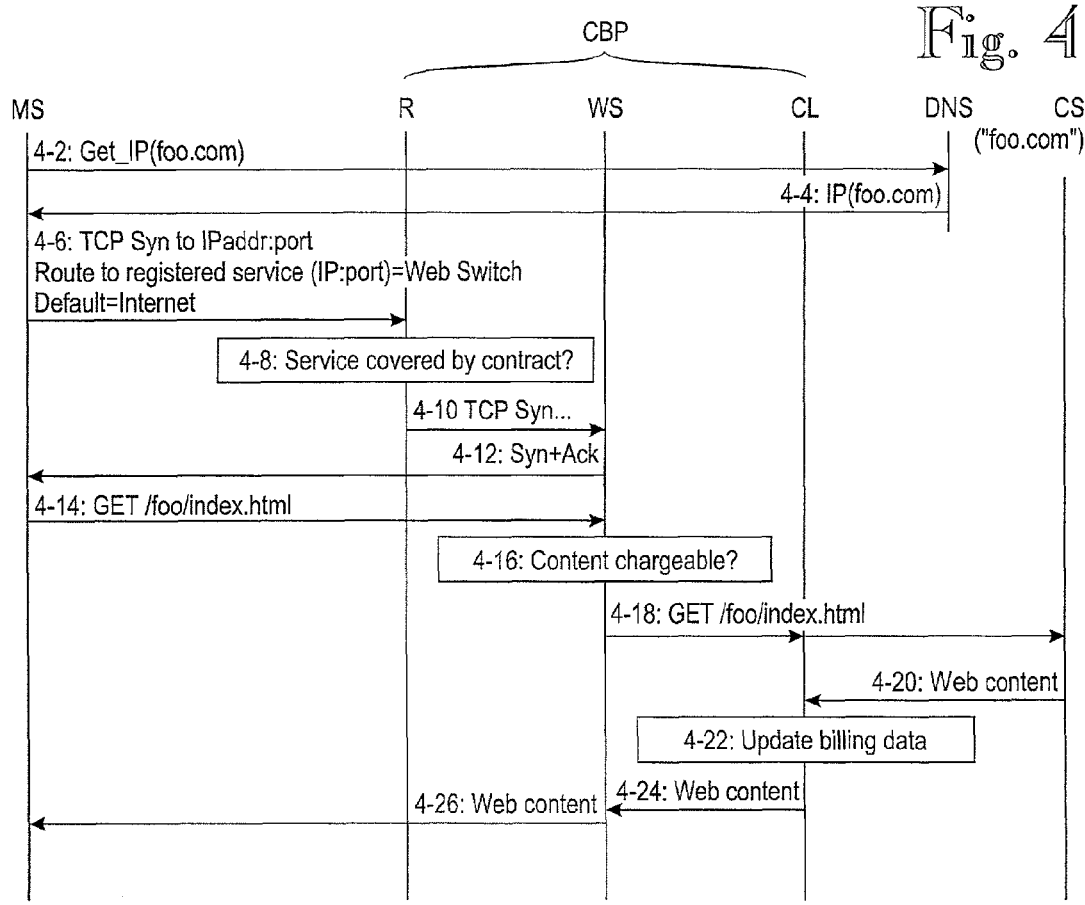
FIG. 4 is a signaling diagram illustrating connection establishment from a mobile station of a user to a server of a content provider.

FIG. 4 is a signaling diagram illustrating connection establishment from a mobile station MS of a user to a server of a content provider, i.e. content server CS. The server CS provides services under the name of foo.com. In step 4-2, the user of the mobile station MS wants to use the services of the content server CS. The mobile station MS sends to a name server DNS a request concerning the name foo.com. In step 4-4, the name server responds by communicating an IP address, for instance '194.197.118.20' corresponding to the name foo.com. In step 4-6, the mobile station MS transmits a TCP packet having as receiver address the IP address of the content server CS and as receiver port number 80, because this is a generally agreed port for WWW servers. The SYN (synchronization) bit is set. The router R in the proxy is configured to identify services whose providers have made an agreement with the operator of the proxy CBP of the invention. Thus, in step 4-8, the router detects that the message it received in step 4-6 relates to such a service. Therefore, In step 4-10, the router does not route the TCP packet through the Internet to the content server CS, but to the web switch WS of the proxy. In step 4-12, the web switch responds to the mobile station MS by transmitting an acknowledgment Syn+Ack. At this stage, the proxy CBP knows the IP address and port number of the service requested by the mobile station MS. The proxy CBP thus knows that the connection establishment request of the mobile station relates to a service under the agreement and handles the connection itself. This information is, however, not sufficient for billing, because for instance different services (pages) in one server may have a different price.

The mobile station MS now imagines that it is in contact with the content server CS. In step 4-14, it requests a first web page by transmitting a message GET having as parameter the address of the requested page in said server. The message can for instance be GET /foo/index.html. In step 4-16, the proxy combines the information it has received, i.e. the IP address and port number received in step 4-10 and the page address received in step 4-14. The proxy can now form a complete URL, for instance 'http://1194.197.118.20/index.html'. Finding the name (for instance 'http://weatherservice.fi') corresponding to an IP address is not easy, so content providers register most preferably on the basis of their IP addresses. In this case, it is assumed that the proxy detects on the basis of its database that the requested service is a chargeable service. In step 4-18, the proxy requests the content from the content server CS. Even though the content is chargeable, the content server CS does not need to know the identity of the mobile user or maintain billing information. Instead, the operator (content provider) maintaining the content server CS has a confidential relationship with the administrator of the proxy CBP. Thus, the content server CS simply provides the requested content in step 4-20. In step 4-22, the proxy updates the billing information related to the mobile station MS (or the corresponding subscriber). This process is described later in more detail. In the remaining steps 4-24 and 4-26 of FIG. 4, the requested content is provided to the mobile station MS.

In this example, all packets thus go through the router R of the proxy CBP. The router R is configured to route directly to the address indicated by the packet such packets that do not relate to chargeable services, or to be more precise, to services whose providers do not have an agreement with the operator of the proxy CBP. The existence of such agreements is recorded in the database DB in the proxy.

Figure 5:
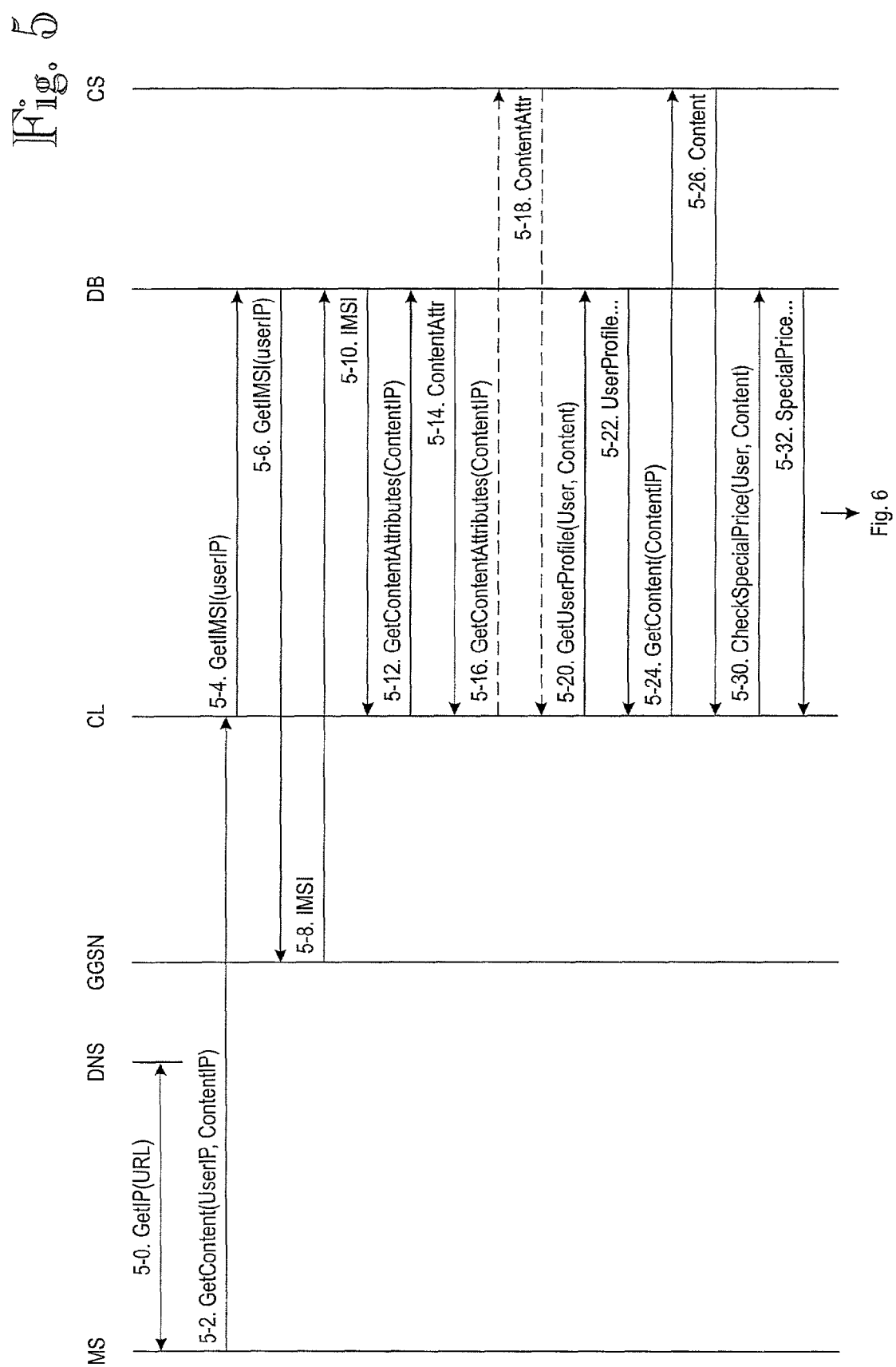
FIGS. 5 and 6 are more detailed signaling diagrams, in which messages related to billing are shown in more detail than in FIG. 4.
Figure 6:
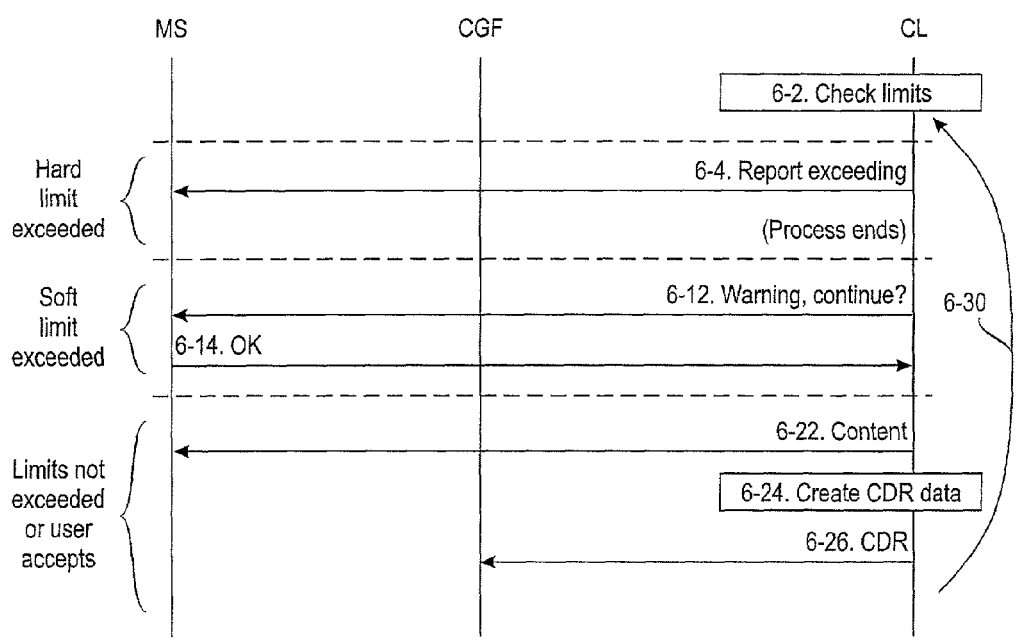

FIGS. 5 and 6 are more detailed signaling diagrams, in which messages related to billing are shown in greater detail than in FIG. 4. In step 5-0, the mobile station MS retrieves from the name server DNS the IP address of the requested service, as shown in steps 4-2 and 4-4 of FIG. 4. In step 5-2, the mobile station MS sends a content request to the content server CS, but the router R routes it to the control logic CL of the proxy. The request contains the requested service and the IP addresses of the mobile subscriber. The IP address is, however, not sufficient to direct the charge to the correct subscriber, because an IP address is unambiguous only momentarily, but not continuously. Therefore in step 5-4, the control logic CL queries the database DB for the subscriber identity in the access network. If the access network is a mobile system, a suitable identity is for instance IMSI (International Mobile Subscriber Identity). In this example, it is assumed that the subscriber identity in the access network is not stored in the database DB, but the database is intelligent enough to query the access network (herein the gateway node GGSN) for it, which it does in step 5-6. In steps 5-8 and 5-10, GGSN returns to the database DB and the database returns to the control logic CL the subscriber's IMSI.

In step 5-12, the control logic CL requests from the database DB, billing attributes related to the requested content. Billing attributes typically include a billing policy (cf. steps 706 and 710 of FIG. 7). If the database DB has the billing attributes related to the service in question, it returns them to the control logic CL in step 5-14. In this example, it is, however, assumed that the database DB does not know the billing attributes related to the service and the control logic CL requests them from the content server CS in steps 5-16 and 5-18. These steps are shown by dashed lines, because they are naturally not needed if the corresponding information is found in the database in steps 5-12 and 5-14.

If the billing attributes are not found in steps 5-12 to 5-18 from the database DB of the proxy or from the content server CS, the proxy CBP will no longer participate in providing the content, but allows the signaling between the terminal and content server through as such, as is done according to prior art.

In this example, it is assumed that the billing attributes are found either in the database or content server, in which case the control logic CL knows on what terms to bill for the service. In steps 5-20 and 5-22, CL requests and receives from the database profile, balance and other information related to the mobile subscriber. This profile, etc. information typically includes such information as to what extent the mobile subscriber has so far used chargeable services. The information can also include a maximum for the unbilled balance and other limitations and/or blocks. In the example of FIG. 5, it is enough to know that the subscriber has not exceeded any credit limits. Therefore in step 5-24, the control logic CL requests the service from the content server CS and receives the requested content in step 5-26. In step 5-30, the control logic CL checks if the user in question is entitled to any special prices related to this service or if s/he has already used this service (in which case s/he could for instance read a certain issue of a newspaper several times during the same day). In step 5-32, the database returns any possible special information related to billing. After this step, the process continues in FIG. 6.

FIG. 6 describes a situation in which the balance limit of the mobile subscriber is exceeded. To be more precise, FIG. 6 shows a preferred embodiment of the invention, according to which the mobile subscriber has two types of balance limits, which herein are called soft and hard limits. A soft limit refers to an alarm limit, at which the service is not blocked, but the subscriber is sent a warning. According to a preferred feature, the subscriber has the possibility to choose whether to receive the requested service or not. A hard limit is one that the user of the terminal cannot pass.

In step 6-2, the control logic CL checks the balance limits related to the payer of the service in question. The payer of the service is normally the subscriber of the terminal, whom the access network operator bills with a telephone bill, but in special agreements, the payer can also be a third party, such as the employer of the subscriber, the provider of the content service, etc.

If the control logic CL detects that a hard balance limit related to the payer has been exceeded or that providing the content service would lead to exceeding a hard limit, the routine moves to step 6-4 in which the user of the mobile station is informed that the hard limit has been exceeded, after which the process is ended.

If, instead, the control logic CL detects that a soft balance limit related to the payer has been exceeded or that providing the content service would lead to exceeding a soft limit, the routine moves to step 6-12 in which the user of the mobile station is asked whether s/he accepts exceeding the limit. If the user does not accept exceeding the limit, the routine moves to step 6-4, after which the process is ended. Step 6-14 shows a situation where the user accepts exceeding the limit. The remaining steps in FIG. 6 are taken if 1) no limits are exceeded, or 2) a soft limit is exceeded but the user accepts this. The service requested in step 6-22 is provided under the control of the control logic to the terminal MS. In step 6-24, the control logic generates the information needed by a charging record CDR and transmits them to the billing gateway BG in step 6-26.

Arrow 6-30 relates to a situation in which the content service is not billed entirely at one time. The content service can be of a streaming type, which means that it is billed separately on the basis of time or transmitted data volume. This, however, differs from the billing based on time or data volume in the access network. In this case, when a certain amount of the content (e.g. a certain time period, data volume, number of files, etc.) has been transmitted, the balance limits can be checked again, i.e. the routine returns to the beginning of step 6.

Figure 7:
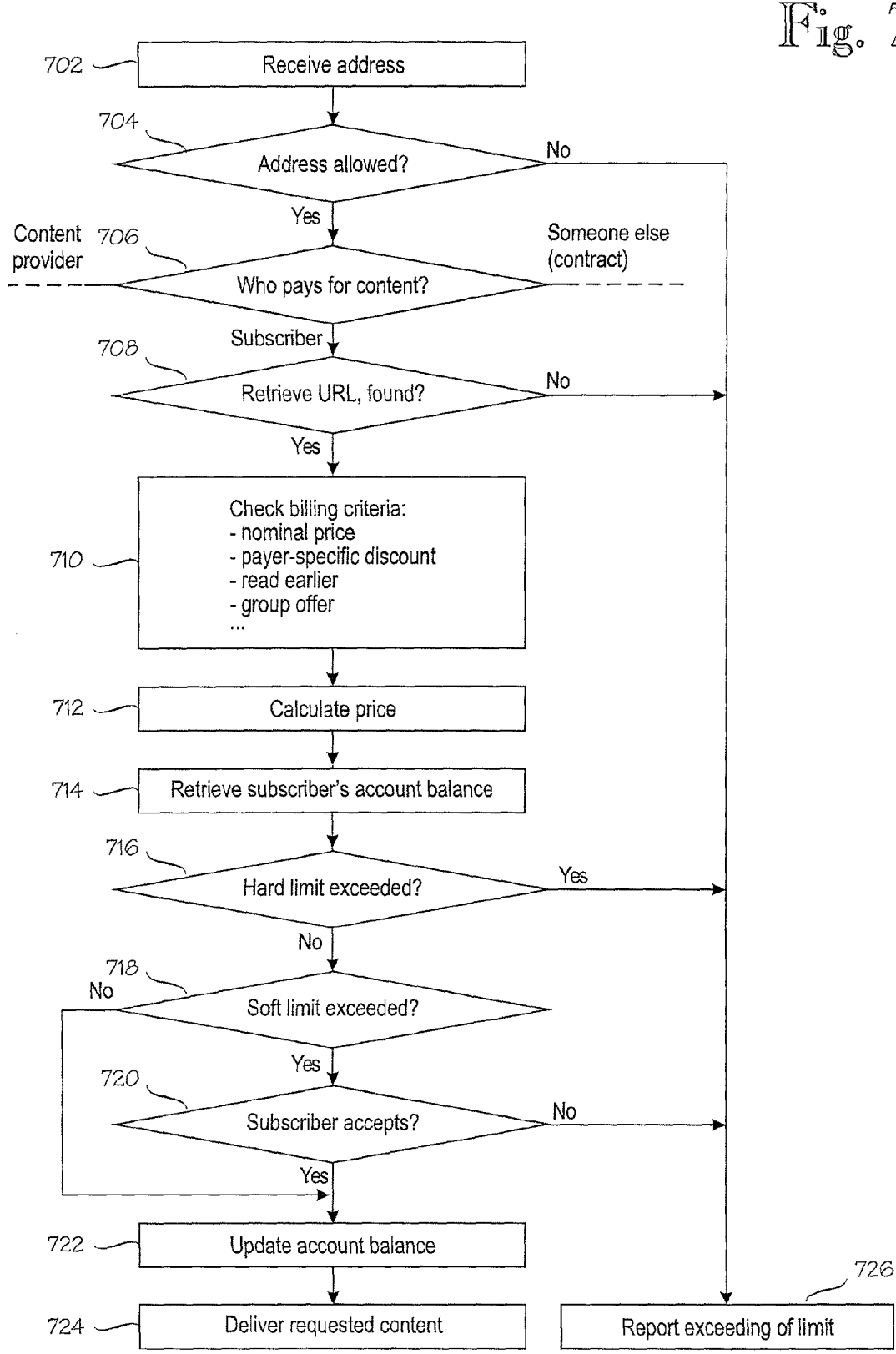
FIG. 7 is a flow chart illustrating the operation of a proxy.

FIG. 7 is a flow chart illustrating the operation of the proxy. FIG. 7 repeats some of the steps shown in signaling diagrams 4 to 6, but in FIG. 7, the emphasis is on processing billing information. It should be noted that the flow chart shown in FIG. 7 is intended as an example only and a corresponding functionality can be achieved by arranging the functions or their order in other ways, too.

In step 702, the proxy CBP receives a content request which indicates the address of the requested server from which the service can be found. In step 704, the proxy checks if the service in question is within the agreement. If not, an error message is generated in step 726. In step 706, the proxy checks, from the database DB for instance, who pays for the content and/or the access network traffic. In this example, it is assumed that the subscriber of the terminal MS pays for the content, in which case the routine moves to step 708 in which the requested content is retrieved from the content server, as shown in FIGS. 4 to 6.

In step 710, the billing criteria are checked, the billing criteria naturally including a nominal price, i.e. price excluding discounts, of the requested service. Discounts can be given on the basis of special offers between the content provider and payer, and such special prices are recorded in the database DB of the proxy. Alternatively, they can be recorded in a database in the content server CS, in which case the proxy CBP requests them from the content server. Discounts may also be given when the page in question has already been read earlier during the same period. A period refers herein to a time during which the content of the service in question remains the same. For instance, a certain issue of a newspaper can be read several times at one charge. If the reader does not have time to read the newspaper during one session, s/he can later continue reading until the newspaper is next updated. The price of the content service can depend on the time of day, for instance because the service provider wants to even out peak periods. The price can also depend on the location of the terminal. Discounts can also be given due to general offers. For instance, a content provider has a campaign in which the use of a certain service entitles to a discount from other services of the content provider. Because the proxy of the invention controls all traffic from the access network to the service network in a centralized manner, even a very complex logic can be implemented in the proxy without needing to copy the logic into several network elements.

In step 712, the price of the requested service is calculated on the basis of the billing criteria, and in step 714, the balance information of the subscriber are retrieved. If different currencies are used in the access network and the service network, it is advantageous if the proxy performs the necessary currency conversions. In step 716, the routine checks if a hard balance limit related to the payer is exceeded. As described in connection with FIG. 6, a hard limit is one that cannot be passed by requesting acceptance from the user, but it is an absolute balance limit set by the operator on the basis of the payer's instructions for said subscriber or subscriber type. Different balance limits can be included into different types of service packages, for instance. If a hard balance limit is exceeded, in step 726 the user is notified of exceeding the limit, and the requested content service is not provided.

In step 718, the routine checks, if a possible soft balance limit is exceeded, i.e. a limit the exceeding of which requires a separate acceptance from the user before the content can be provided. A soft limit can for instance be based on the balance exceeding or having exceeded a certain threshold value or the price of the requested service exceeding a certain threshold value. If such a soft limit is exceeded, the subscriber is asked to accept this in step 720. If the user does not accept, the fact that the limit has been exceeded is communicated in step 726.

If neither of the limits are exceeded, or the soft limit is exceeded, but the user accepts it, the balance information of the subscriber is updated in step 722, and the requested service is provided in step 724. The proxy can also perform any required protocol conversions from the protocol used by the content server CS to a protocol supported by the access network AN.

In the above, it has so far been assumed that the content service is billed to the subscriber/payer afterwards. The above description can, however, easily be modified so that the service is paid in advance.

It is thus assumed in the steps of FIG. 7 described above that the user of the service (content) is also its payer. In step 706, it would also be possible that the content provider pays for the content. In such a case, the balance of the subscriber of the mobile station is not processed at all. In a special case, the content provider also pays for the traffic generated in the access network. This way, 0800-type telecommunication can be implemented, in which the content, i.e. service, provider pays all telecommunications costs. It is also possible that the content is paid by a third party, for instance the employer of the subscriber according to a separate agreement. The employer can for instance pay for access to work-related services. This payment is, with respect to processing the balance, similar to the case described in FIG. 7, in which the subscriber pays for the content. If the employer pays for access to work-related services without a maximum, no soft limits are needed. The employer can, however, set a maximum to the costs, in which case using limits is sensible in this case, too.

It is apparent to a person skilled in the art that the above examples related to preferred embodiments of the invention are not intended to limit the invention but to illustrate it. Even though the http protocol, for instance, has been used as an example, it is clear that other protocols can also be used, and the basic idea of the invention can be implemented in may different ways. The invention and its embodiments are thus not restricted to the examples described above, but can vary within the scope of the claims.

Abbreviations (not all are official)
AN: Access Network
BC, BG: Billing Centre, Gateway
CBG: Content Billing Gateway
CDR: Charging Detail Record
CL: Control Logic
CS: Content Server
DNS: Domain Name System/Server
GGSN: Gateway GPRS Support Node
GSN: GPRS support node
HLR (Home Location Register
IMSI: International Mobile Subscriber Identity
IP: Internet Protocol
MS: Mobile Station
NAT: Network Address Translation
PCU: Packet Control Unit
SGSN: Serving GPRS Support Node
SN: Service Network
TCP: Transmission Control Protocol
URL: Universal Resource Locator
WS: Web Switch

The invention claimed is:

1. A method for providing a piece of content to a subscriber terminal from a content server, wherein the provision of the content from the content server to the subscriber terminal is controlled by a proxy, and said control of the content provision comprises the following steps:
    receiving, from the subscriber terminal, in the proxy a content request for providing the content, determining that the content identified in the content request comprises content included in an agreement between an operator of the content server and an operator of the proxy, determining, by the proxy, whether or not the content is chargeable content, wherein the determining step includes accessing a database that includes information that is indicative of which content is chargeable and which content is free to end users connected to a network, determining by means of the proxy a billing address for the chargeable content, forwarding, by the proxy, the content request from the subscriber terminal to the content server, forwarding, by the proxy, the content corresponding to the content request from the content server to the subscriber terminal, and generating billing information related to the chargeable content, wherein generating billing information includes accessing a subscriber terminal profile, and wherein the subscriber terminal profile includes a prepaid amount provided by an end user of the subscriber terminal.

2. A method as claimed in claim 1, wherein the subscriber terminal is located in an access network in which the subscriber terminal is addressed by an access network subscriber identity, and the content server is located in a service network in which it is addressed by an IP address, and wherein the determination of the billing address comprises the following steps:

allocating an IP address to the subscriber identity in the access network or at its edge, receiving in the proxy the IP address allocated to the subscriber identity, determining in the proxy on the basis of the received IP address the subscriber identity of the subscriber terminal and using it to determine the billing address.

3. A method as claimed in claim 2, wherein the determination of the subscriber identity on the basis of the received IP address comprises an inquiry to a database in the proxy.

4. A method as claimed in claim 2, wherein the determination of the subscriber identity on the basis of the received IP address comprises an inquiry to the access network.

5. A method as claimed in claim 1, wherein the subscriber identity of the subscriber terminal is hidden from the content server.

6. A method as claimed in claim 1, wherein the generation of the billing information related to the content comprises the step of maintaining billing criteria in a database functionally connected to the proxy.

7. A method as claimed in claim 1, wherein the billing criteria comprise the payer of the content.

8. A method as claimed in claim 1, wherein if a content provider pays for the content, the content provider pays for telecommunications costs between the subscriber terminal and the proxy, in which case the use of the content is completely free of charge to the subscriber.

9. A method as claimed in claim 1, wherein the billing criteria comprise information on whether the subscriber in question has already been billed for the same content, in which case the following uses of the same content will be billed according to a lower tariff or not at all.

10. A method as claimed in claim 1, wherein the billing criteria comprise information on whether the content in question belongs to a group of content segments with a special price.

11. The method of claim 1, wherein determining the billing address comprises:

allocating an IP address to the subscriber terminal in an access network;

receiving, in the proxy, the IP address allocated to the subscriber terminal; and determining, in the proxy, a subscriber identity based on the IP address and correlating it to the billing address.

12. The method of claim 1, wherein the billing information is generated based on billing criteria that includes whether or not the subscriber terminal has previously been billed for the same content.

13. The method of claim 1, wherein the billing information is generated based on billing criteria that includes whether or not the content is part of a group of content segments that are offered at a special price.

14. The method of claim 1, wherein if the content is part of a group of content segments, then the subscriber terminal is entitled to use a portion of the group at a lower price or for free.

15. The method claim 1, further comprising:

performing, by the proxy, one or more currency conversions in cases where currencies used in an access network, to which the subscriber terminal is part of, and a service network, which can couple the proxy and the content server, are different.

16. The method of claim 1, further comprising:

performing, by the proxy, one or more protocol conversions in cases where protocols used in an access network, to which the subscriber terminal is part of, and a service network, which can couple the proxy and the content server, are different.

17. The method of claim 1, wherein generating billing information further includes billing the subscriber terminal for content delivered by the content server to the subscriber terminal.

18. The method of claim 1, wherein the proxy does not forward the content request to the content server until the proxy identifies that selected content is included in the agreement between the operator of the content server and an operator of the proxy.

19. The method of claim 1, wherein the subscriber terminal profile includes a maximum amount for unbilled content that is reflected by an agreement between an end user of the subscriber terminal and an operator of the content server or an operator of the proxy.

20. The method of claim 1, wherein the proxy does not fulfill the content request if the maximum amount for unbilled content has been reached.

21. The method of claim 1, wherein the content is not billed at one time because it corresponds to streaming content.

22. The method of claim 1, wherein a price for the content is determined based on a time at which the content is requested.

23. A method for providing a piece of content to a subscriber terminal from a content server, wherein the provision of the content from the content server to the subscriber terminal is controlled by a proxy, and said control of the content provision comprises the following steps:

receiving, from the subscriber terminal, in the proxy a content request for providing the content, determining, by the proxy, whether or not the content is chargeable content, wherein the determining step includes accessing a database that includes information that is indicative of which content is chargeable and which content is free to end users connected to a network, determining by means of the proxy a billing address for the chargeable content, forwarding, by the proxy, the content request from the subscriber terminal to the content server, forwarding, by the proxy, the content corresponding to the content request from the content server to the subscriber terminal, and generating billing information related to the chargeable content, wherein generating billing information includes accessing a subscriber terminal profile, and wherein the subscriber terminal profile includes a pre-paid amount provided by an end user of the subscriber terminal, wherein said billing information related to the content is sent to the access network to be combined with billing information of the access network.

24. A proxy system for providing content service, the apparatus comprising:

a router component in communication with a subscriber terminal through an access network, the router component operable to receive a request for content service from the subscriber terminal and to determine if the content service is chargeable, the content being provided by a content server;

a processor device further comprising control logic further operable to determine that the content identified in the content request comprises content included in an agreement between an operator of the content server and the operator of the proxy, a web switch component operable to receive the request from the router component, and to forward the request to the content server and deliver the content service to the subscriber terminal if the content service is chargeable; and the processor device further comprising control logic operable to determine a billing address for the subscriber terminal based on a subscriber identity that uniquely identifies the subscriber terminal to the access network, to monitor the delivery of the content service to the subscriber terminal, and to generate billing information based on the delivery of the content service.

25. The proxy system of claim 24, wherein the processor device further comprises control logic operable to transmit the billing information to a billing system associated with the access network for combination with billing information maintained by the access network.

26. The proxy system of claim 24, wherein the processor device determines the billing address by matching the subscriber identity to a network address received from the subscriber terminal.

* * * * *